United States Patent [19]

Ballestrazzi et al.

[11] Patent Number: 5,234,531
[45] Date of Patent: Aug. 10, 1993

[54] LONGITUDINAL WELDING APPARATUS IN A PACKAGING MACHINE

[75] Inventors: Aris Ballestrazzi; Lamberto Tassi, both of Savignano Sul Panaro, Italy

[73] Assignee: Sitma S.p.A., Spilamberto, Italy

[21] Appl. No.: 872,589

[22] Filed: Apr. 23, 1992

[30] Foreign Application Priority Data

May 17, 1991 [IT] Italy .................. MI-91-A001363

[51] Int. Cl.$^5$ ............... B65B 51/00; G05G 15/00
[52] U.S. Cl. ............................. 156/359; 53/51; 493/8
[58] Field of Search .......... 156/359; 493/8, 10; 53/51, 64, 75; 219/243, 244, 245, 469

[56] References Cited

U.S. PATENT DOCUMENTS

| | | | |
|---|---|---|---|
| 4,381,637 | 5/1983 | Ballestrazzi et al. | 53/51 |
| 4,769,102 | 9/1988 | Neumüller et al. | 156/359 |
| 4,834,830 | 5/1989 | Heeler et al. | 156/583.1 |

FOREIGN PATENT DOCUMENTS 0220759 5/1987 European Pat. Off.

Primary Examiner—David A. Simmons
Assistant Examiner—William J. Matney, Jr.
Attorney, Agent, or Firm—Hedman, Gibson & Costigan

[57] ABSTRACT

A longitudinal welding apparatus in a packaging machine for products fed on a conveyor belt, comprising a rocking circular welder which overlies the superposed longitudinal edges of a continuous plastics film in which the products are wrapped, the rocking circular welder consisting of at least two independently powered, separate semicircular welding elements, the welder being rotatable to position one of its welding elements on the superposed edges of the film, sensors being provided to measure the speed of advancement of the film and to control, via an electronic control device, both the rotation of the welder and the variation in the feed voltage of at least one of the welding elements.

5 Claims, 4 Drawing Sheets

LONGITUDINAL WELDING APPARATUS IN A PACKAGING MACHINE

BACKGROUND OF THE INVENTION

In machines for packaging products fed one after another which use continuous plastic film of heat-shrinkable or non-heat shrinkable type, it is known to weld the film, when wrapped around the product, in a direction transverse to the product and film feed direction, to form a package which is at least partly closed.

In this respect, it should be noted that the longitudinal superposed edges of said film always remain free, the result being that the formed package can to some extent be tampered with.

In view of this it is advantageous to weld along the longitudinal superposed edges in order to completely close the package and make it impossible to tamper with the product contained within the film.

This further longitudinal welding operation requires re-handling of the transversely welded packages, so increasing packaging costs and sometimes requiring a further operator to carry out this latter operation.

Longitudinal welding apparatus operating continuously and automatically are also known and used for this purpose. These apparatus weld the edges of the film during its advancement, by means of a welder comprising a circular or simply circumferential arc-shaped surface arranged to press on the film. In such cases the welder is mounted on a shaft so that it can undergo rotary or rocking movement to weld the film edges.

By using such apparatus it is also possible to preset the welding temperature and so adapt the temperature to the characteristics and thickness of the plastics film.

However, modern product packaging machines comprise systems for automatically controlling the speed at which the products are fed, in order to adapt the operation of the packaging machine to the rate at which the storage containers release the products to be packaged.

This results in sudden changes in the rate of product supply, such variations directly influencing the time for which the welder remains in contact with the film to be welded.

These rate variations are not previously predictable, with the result that the facility on said apparatus for presetting only the welding temperature without being able to adapt it to the rate of operation of the packaging machine is totally inadequate.

In addition the welding temperature control is difficult to achieve with the rapidity necessary for the particular type of application.

In this respect, although the temperature of a welding element can be raised rapidly by merely increasing the electrical voltage, its temperature cannot be lowered with the same rapidity.

Because of the large heat capacity of the welding element it remains at high temperature even when the voltage is removed. The rate at which the temperature falls depends totally on the heat capacity of the welding element and the rapidity with which said welding element transfers heat to the surrounding environment.

The object of the present invention is to provide a longitudinal welding apparatus in a packaging machine of the stated type and for the stated applications which enables continuous and completely automatic welding to be effected by achieving proper temperature control even during sudden variations in the rate of operation of the packaging machine.

SUMMARY OF THE INVENTION

This object is achieved by a longitudinal welding apparatus within a machine for packaging products fed onto a conveyor belt operated by a variable speed drive, in which the products are wrapped in a continuous plastics film having superposed longitudinal edges, said apparatus comprising a frame, a rocking circular welder lying in a longitudinal vertical plane and overlying said longitudinal edges of the film, and at least one pressing and accompanying belt positioned above said products wrapped in said film, said welder being mounted rockable on a shaft, first means for providing the rocking movement to said welder relative to said shaft and second means for operating said pressing belt being operationally connected to said variable speed drive, said shaft carrying said welder being movable relative to said frame, by a raising and lowering device, between a lowered position in which said welder is in contact with said superposed longitudinal edges of the film when the packaging machine is in movement, and a position raised from the film when the packaging machine is at rest, characterised in that said rocking circular welder consists of at least two separate independently powered welding elements of semi-circular shape, said welder being at least partly rotatable on said shaft by an actuator means supported on a rocker element rotatable on said shaft so as to position one of said welding elements on said superposed film edges, sensor means being provided to measure the speed of advancement of said film and to control by way of an electronic control device both said actuator means for partly rotating said shaft and the variation in the feed voltage to at least one of said welding elements.

In a preferred embodiment of the apparatus according to the present invention, said actuator means consists of a cylinder with a rotating piston.

Again in a preferred embodiment of the apparatus according to the present invention, said separate welding elements are two in number and are arranged opposing each other.

BRIEF DESCRIPTION OF THE DRAWING

The structural and operational characteristics and the advantages of an apparatus according to the present invention will be more apparent from the description given by way of non-limiting example with reference to the accompanying schematic drawings, in which.

DESCRIPTION OF THE PREFERRED EMBODIMENT

Figure 1:
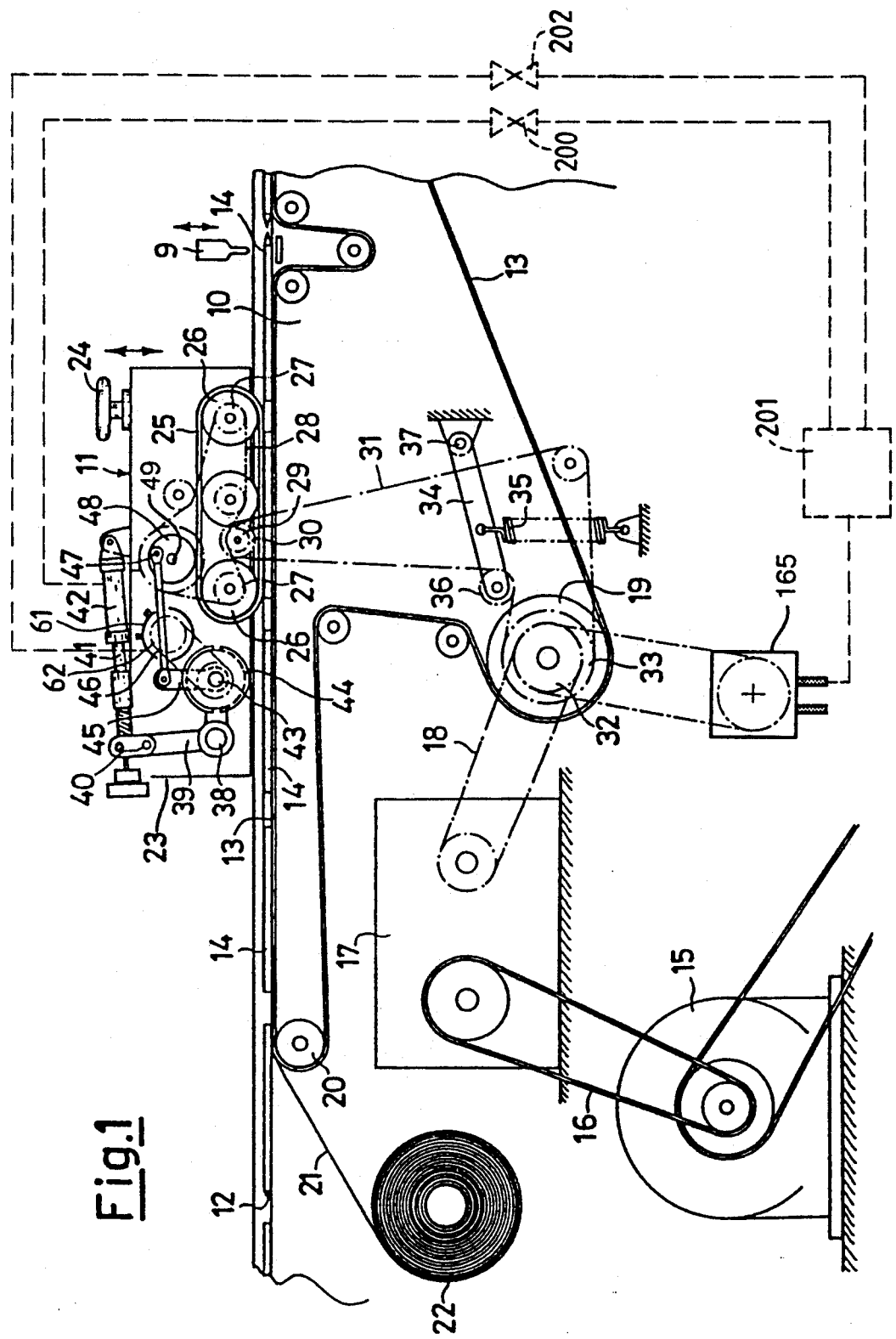
FIG. 1 is a schematic side view of the apparatus according to the present invention.
Figure 2:
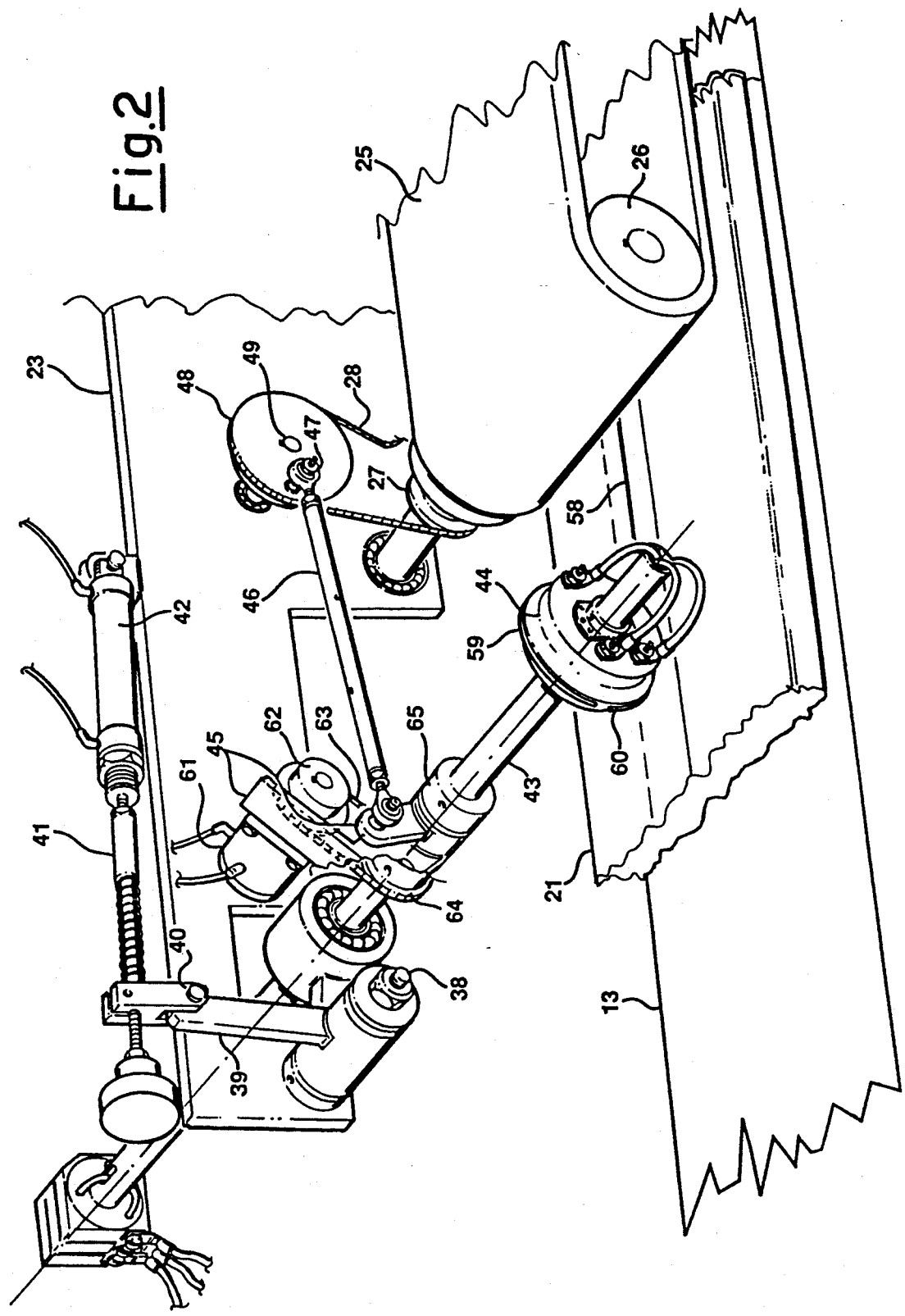
FIG. 2 is a perspective view of part of the apparatus of FIG. 1.
Figure 3:
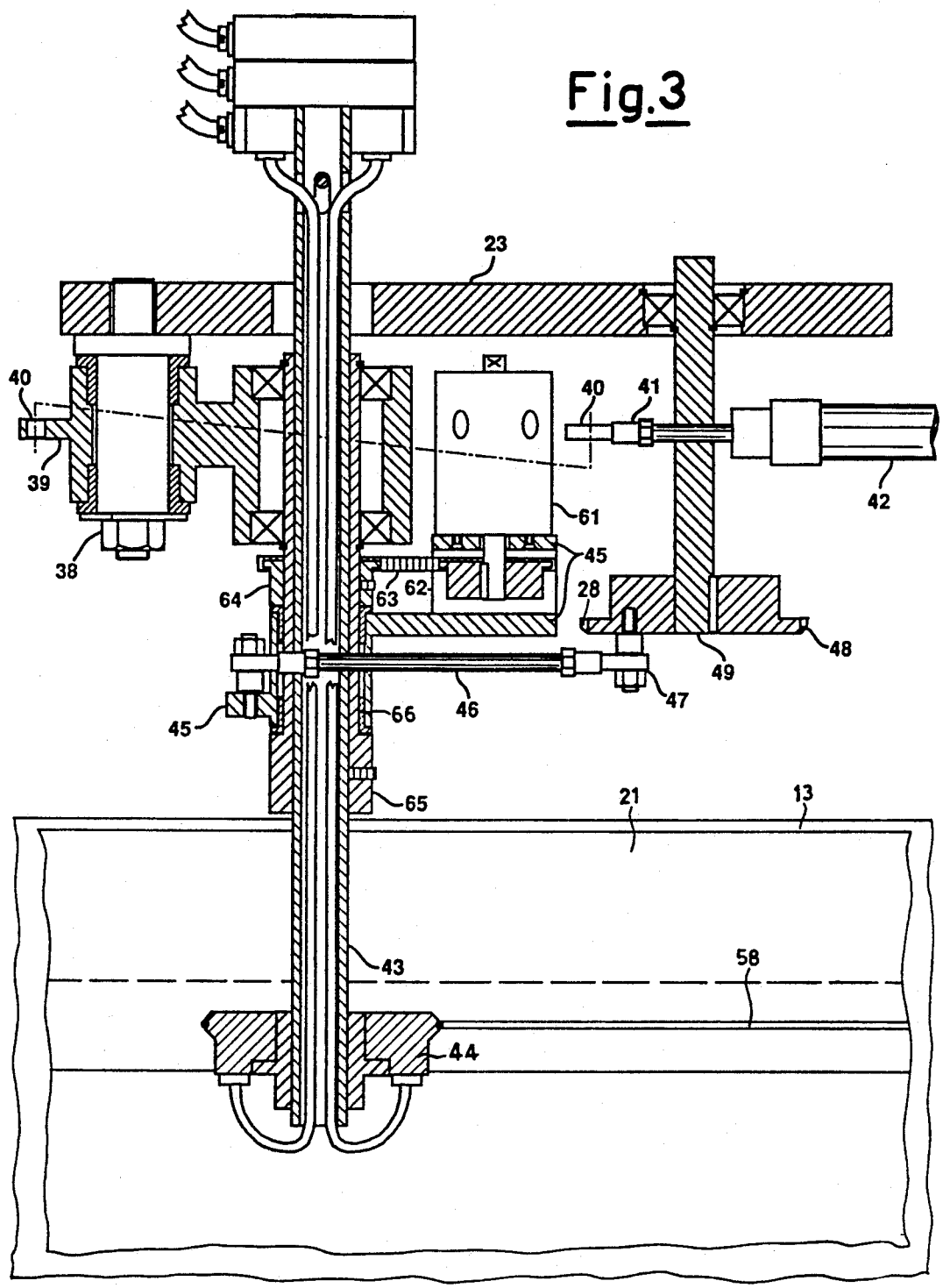
FIG. 3 is a section through the apparatus of FIG. 2, seen from above.

With reference to the accompanying FIGS. 1 to 3, it can be seen that a side 10 of a packaging machine supports a longitudinal welding apparatus indicated overall by 11.

The packaging machine comprises essentially a conveyor belt 13 for conveying a series of products 14 to be packaged.

The series of products 14 to be packaged is fed onto the conveyor belt 13 by pusher means indicated schematically by 12.

A central variable speed drive 15 drives by means of a belt transmission 16 a further intermediate variator 17, which by means of a cascade chain transmission 18 drives a drive roller 19, about which the conveyor belt 13 guidedly passes.

In correspondence with the zone in which the products 14 are fed there is a deviation roller 20 for the conveyor belt 13, towards which a plastics film 21 is guided.

In this manner the film 21, which unwinds from a reel 22, becomes interposed between the conveyor belt 13 and the products 14 to be packaged.

In known manner the continuous film 21 is completely wrapped about said products 14 with its longitudinal lateral edges superposed, before arriving at the longitudinal welding apparatus 11 and at a known transverse welding device indicated schematically by 9.

The apparatus 11 comprises a lateral support shoulder 23 positioned above the side 10 of the frame.

From the accompanying figures it can be seen that the lateral shoulder 23 can be operationally moved vertically by a presser handwheel 24.

In this manner, when the thickness of the product/- changes it becomes easily possible to adjust their engagement with a pressing and accompanying belt 25.

The pressing and accompanying belt 25 is in the form of an endless loop and is supported on at least one pair of end rollers 26 rotatably secured to said shoulder 23.

The end rollers 26 are provided laterally with sprockets 27 driven by a chain transmission 28.

A first toothed wheel 29 drives the chain transmission 28 and is axially rigid with and coupled to a second toothed wheel 30 of different diameter and number of teeth than the first and driven by a chain transmission 31.

A pair of toothed wheels 32 and 33, having a mutually different number of teeth, are fixed onto the side of said drive roller 19.

The first welding element 32 is connected to the output chain transmission 18 from the intermediate variator 17, while the second welding element 33 is connected to the chain transmission 31 driving the longitudinal welding apparatus 11.

This latter chain transmission 31 is provided with a tensioning lever 34 pivoted at 37 to the side 10 and maintained in its operating position by an elastic element or spring 35.

A small idle deviation welding element 36 is pivoted to the free end of the tensioning lever 37.

The lateral shoulder 23 supports, pivoted centrally on a shaft 38, a right angled lever 39 having its upper end pivoted at 40 to the adjustable rod 41 of a cylinder and axial piston unit 42 hinged at its other end to the lateral shoulder 23.

At its other end the right angled lever 39 rotatably supports a hollow shaft 43 carrying a longitudinal welder 44 rigid therewith.

The body of the welder 44 is fixed on the shaft 43, while a rocker element 45 connected to a connecting rod 46 is rotatably supported on the shaft 43 by way of a plain bearing 66.

The other free end of the connecting rod 46 is pivoted at 47 to a sprocket-crank 48.

The sprocket-crank 48, which is fixed onto and supported on a shaft 49 rotatable relative to the shoulder 23, is rotated by the chain transmission 28 which drives the accompanying belt 25.

The sprocket-crank 48 together with the connecting rod 46 and rocker element 45 forms an articulated quadrilateral which converts the continuous rotary motion of the sprocket-crank 48 into reciprocating rocking motion of the rocker element 45, and consequently of the longitudinal welder 44 rigid with it.

The right angled lever 39 and the cylinder and axial piston unit 42 form the device which lowers or raises the longitudinal welder 44 each time the packaging machine is started or stopped respectively.

The cylinder and axial piston unit 42 is controlled, via a solenoid valve 200, by an electronic control device 201, as shown schematically in FIG. 2, so that the welder 44 is lowered or raised automatically on starting or stopping the packaging machine.

To adapt the temperature of the welder 44 to the running speed of the conveyor belt 13 of the packaging machine there is further provided a speed measurement device 165, preferably a tachometer dynamo, for measuring the instantaneous speed of rotation of the drive roller 19 which drives the conveyor belt 13.

The speed measurement device 165 is connected to the electronic control device 201 which by processing the information received is able to regulate the feed voltage to the welder 44 and hence adapt the welding temperature to the running speed of the film 21.

Moreover in the apparatus of the present invention, to achieve immediate reductions in the temperature of the welding element, the welding head 44 is provided with more than one welding element, these being powered independently.

In this manner, when it is required to lower the welding temperature during machine operation, it is necessary merely to use another hot welding element which has been previously maintained at a lower temperature.

Figure 4:
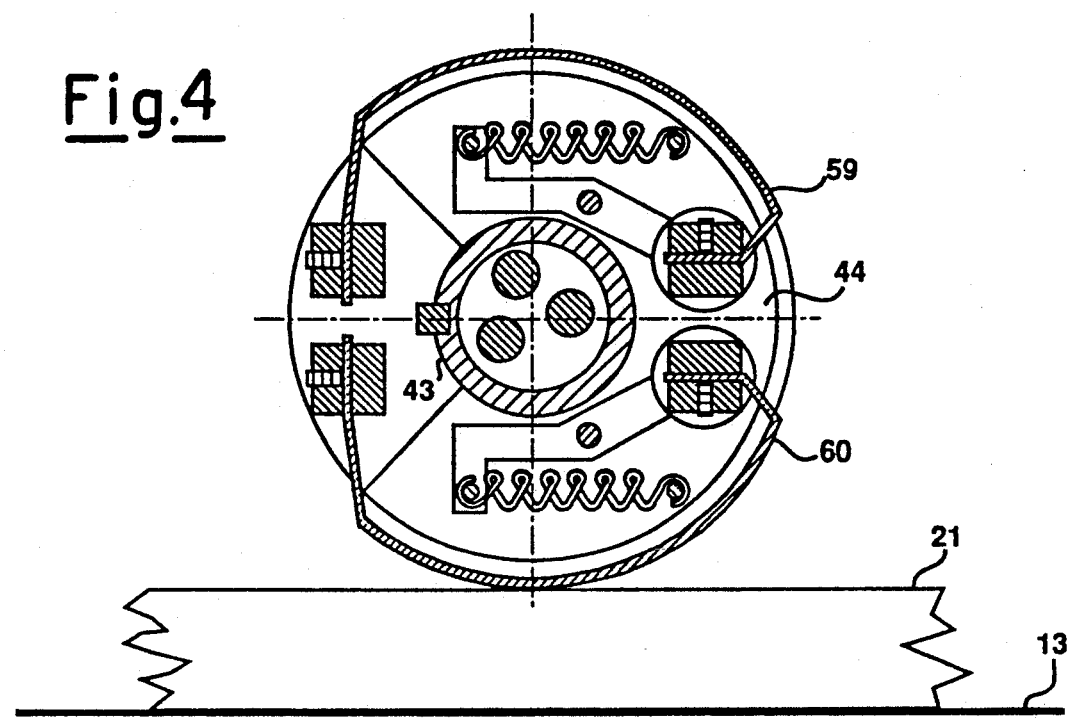
FIG. 4 is a vertical section through a welder contained in the apparatus of the present invention.

In this respect, from FIGS. 2 and 4 it can be seen that the welding part of the rocking welder 44 is formed from two opposing, semi-circular hot welding elements 59 and 60, for example of wire type, arranged longitudinally in the direction in which the products move, so as to form a continuous weld 58.

The welding elements 59 and 60 are mounted on the circular head of the welder 44 such that each one of them covers at least a large part of one half of the circumference of the head of the welder 44.

At this point it is apparent that by suitably powering the two welding elements 59 and 60 and suitably varying the rotation of the head of the welder 44 during the rocking movement, the welding temperature can be rapidly adjusted if the feed speed of the packaging machine changes.

To rotate the head of the welder 44 a cylinder of rotating axial piston type 61 is provided secured to the rocker element 45, its piston rigidly carrying a sprocket 62, the sprocket 62 being connected by a chain 63 to a sprocket 64 rigid with a sleeve 65.

As the sleeve 65 is rigid with the shaft 43 on which the welder 44 is directly fixed, and by virtue of the presence of the bearing 66, the rotation of the cylinder 61 is transmitted to the welder 44 absolutely independently of the normal oscillatory movement caused by the quadrilateral formed by the sprocket-crank 48, the connecting rod 46 and the rocker element 45.

The cylinder of rotating piston type 61 is also controlled by the electronic control device 201 via a solenoid valve 202.

The electronic device 201 is also able to control the electrical feed to the welding elements 59 and 60 independently of each other by suitably processing the information relating to the running speed of the conveyor belt 13 received from the speed measurement device 165.

The operation of the control system for the longitudinal welding apparatus is described hereinafter with reference to the operational block diagram of FIG. 5, in which all the indicated variables are to be considered normalized.

The measurement 303 of the rotation speed 301 of the conveyor belt 13 is effected by a transducer 302.

Figure 5:
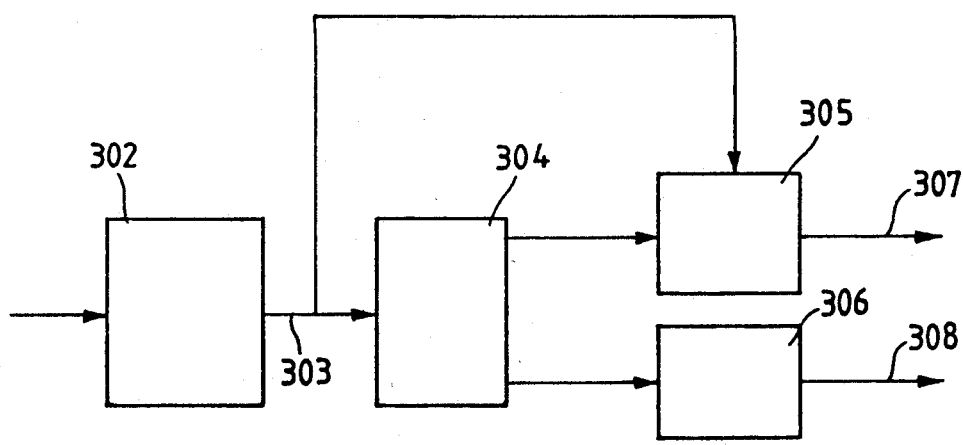
FIG. 5 is an operational block diagram of the control system for the apparatus of the present invention.

The transducer 302 of the operational scheme of FIG. 5 corresponds to the speed measurement device 165 in the mechanical scheme of FIG. 1.

The speed measurement 303 enters a "threshold" block 304, which decides which of the two blocks 305 and 306 is to be activated.

The choice of which of the blocks 305 or 306 is to effect the welding operation having been made, it is mechanically brought into play by rotating the head of the welder 44 to bring into contact with the film 21 the welding element 60 or the welding element 59 respectively.

It can be seen that the block 305 uses the speed measurement 303 to dynamically vary the temperature of the welding operation 307, whereas the block 306 effects a welding operation 308 at constant temperature.

The "threshold" block 304 operates in such a manner as to select the welding operation 308 for low running speeds and the welding operation 307 for high running speeds.

It will be appreciated that in this manner if the high temperature welder 307 is active and it becomes necessary to reduce the welding temperature because of a sudden reduction in the running speed, the control device, which cannot reduce the temperature of the welding element 60, selects the low temperature welding operation 308 by rotating the welder 44 and using the welding element 59.

It will also be apparent that the operator can set the operating parameters both of the threshold block 304 and of the blocks 305 and 306, to obtain a device which although being completely automatic has optimum characteristics of interactivity and versatility of operation.

We claim:

1. A longitudinal welding apparatus within a machine for packaging products fed onto a conveyor belt operated by a variable speed drive, in which the products are wrapped in a continuous plastics film having superposed longitudinal edges, said apparatus comprising a frame, a rocking circular welder lying in a longitudinal vertical plane and overlying said longitudinal edges of the film, and at least one pressing and accompanying belt positioned above said products wrapped in said film, said welder being mounted rockable on a shaft, first means for providing the rocking movement to said welder relative to said shaft and second means for operating said pressing belt being operationally connected to said variable speed drive, said shaft carrying said welder being movable relative to said frame, by a raising and lowering device, between a lowered position in which said welder is in contact with said superposed longitudinal edges of the film when the packaging machine is in movement, and a position raised from the film when the packaging machine is at rest, characterised in that said rocking circular welder consists of at least two separate independently powered welding elements of semi-circular shape, said welder being at least partly rotatable on said shaft by an actuator means supported on a rocker element rotatable on said shaft so as to position one of said welding elements on said superposed film edges, sensor means being provided to measure the speed of advancement of said film and to control by way of an electronic control device both said actuator means for partially rotating said shaft and the variation in the feed voltage to at least one of said welding elements.

2. An apparatus as claimed in claim 1, characterised in that said actuator means consists of a cylinder with a rotating piston.

3. An apparatus as claimed in claim 1, characterised in that said separate welding elements are two in number and are arranged opposing each other.

4. An apparatus as claimed in claim 1, characterised in that said shaft consists of a hollow shaft rotatably supporting said rocker element, there being rigid with said hollow shaft a sprocket engaging a transmission transmitting the motion for partial rotation from a second sprocket and controlled by said actuator means secured to said rocker element.

5. An apparatus as claimed in claim 1, characterised in that said electronic control device comprises display and control means for setting parameters for adjusting the welding temperature of said welding elements in accordance with the characteristics of said film to be welded.

* * * * *